United States Patent [19]
Grimfjärd et al.

[11] Patent Number: 5,738,823
[45] Date of Patent: Apr. 14, 1998

[54] MELTDOWN APPARATUS

[75] Inventors: Göran Grimfjärd, Västeras; Erik Alfred Lassander, Viken, both of Sweden; Gerhard Lempa, Waldshut-Tiengen, Germany; Sven-Einar Stenkvist, Brugg, Switzerland

[73] Assignee: Asea Brown Boveri AG, Baden, Switzerland

[21] Appl. No.: 681,477

[22] Filed: Jul. 23, 1996

[30] Foreign Application Priority Data

Jul. 24, 1995 [DE] Germany ............ 195 26 704.4

[51] Int. Cl.$^6$ ............ F27D 17/00; C22B 7/00
[52] U.S. Cl. ............ 266/242; 266/245; 373/8; 75/10.66
[58] Field of Search ............ 266/200, 242, 266/243, 245; 75/10.66, 10.63, 529, 523; 373/8

[56] References Cited

U.S. PATENT DOCUMENTS

| | | | |
|---|---|---|---|
| 3,812,275 | 5/1974 | Schempp et al. | 373/8 |
| 4,098,603 | 7/1978 | Roth et al. | 75/10.66 |
| 4,149,024 | 4/1979 | Stenkvist et al. | 373/8 |
| 4,514,218 | 4/1985 | Inagaki | 75/10.66 |
| 4,655,826 | 4/1987 | Finkl | 75/10.66 |
| 5,286,277 | 2/1994 | Aizatulov et al. | 75/523 |

FOREIGN PATENT DOCUMENTS

| | | |
|---|---|---|
| 0 630 977 | 12/1994 | European Pat. Off. . |
| 0630977A1 | 12/1994 | European Pat. Off. . |
| 10 00 412 | 1/1957 | Germany . |
| 14 33 424 | 2/1969 | Germany . |
| 3340472A1 | 5/1985 | Germany . |
| 3531261A1 | 3/1987 | Germany . |
| 3840486A1 | 6/1990 | Germany . |
| 4215858A1 | 11/1993 | Germany . |
| 42 36 510 | 4/1994 | Germany . |
| 939521 | 10/1963 | United Kingdom . |

OTHER PUBLICATIONS

Patent Abstracts of Japan, vol. 010, No. 139, (C–348), published May 22, 1986;, JP-A-61 000513; and.
Radex Rundschau, Nr. 2541972, pp. 79–91, E. Friedel, "Beitrag zur Dimensionierung von LD-Tiegeln".
"State-of-the-Art Solutions for Cost-effective Steel Production", Mueller, et al., Steel Standard, No. 2, Dec. 1994, pp. 1–7.

*Primary Examiner*—Scott Kastler
*Attorney, Agent, or Firm*—Burns, Doane, Swecker & Mathis

[57] ABSTRACT

To improve operation, particularly to allow more universal use, in which both liquid and solid crude metal, especially iron can be refined in only one reactor vessel, a reactor vessel (1) is of converter-like design with a relatively large space above a melt (7) and with slag (8) lying above said melt. For the removal of slag (8) via a closable slag channel (18'), the meltdown apparatus can be rotated about a center of rotation (20) through ±8°. For the complete removal of the melt (7) via a closable melt channel (17') in the bottom region of the meltdown apparatus, the latter can be rotated about a center of rotation (19) through ±30. A magnetic coil (16) fed with direct current and arranged around the meltdown apparatus (1) serves for the magnetic damping of movements of melt (7) and/or slag (8) inside the meltdown apparatus. In the converter mode, a graphite electrode (5) used in the arc mode is replaced by a gas supply conduit, through which oxygen is then supplied under pressure.

4 Claims, 2 Drawing Sheets

MELTDOWN APPARATUS

BACKGROUND OF THE INVENTION

1. Field of the Invention

The invention precedes from a meltdown apparatus. The invention also relates to a use of the meltdown apparatus.

2. Discussion of Background

The invention refers to a state of the art, such as is known from a publication by H. G. Müller, L. P. Hofer, H. A. Berger, R. G. Genter, "State-of-the-Art Solutions For Cost-effective Steel Production" in the journal: Steel Standard, No. 2, 1994, pp. 2–7. There, in an alternating current arc furnace, electrical energy for the melting process is introduced into the furnace space via a plurality of electrodes. Oxygen, fossil fuel, coal and/or coke are supplied from the side as further energy media by means of lateral lances or postcombustion nozzles. Furthermore, nitrogen, $CH_2$, $O_2$ or inert gas are introduced through the bottom by means of bubble bricks, in order to produce steel from various proportions of liquid iron, solid iron, spongy iron and scrap iron. In this process, relatively high bath movement and vigorous boiling occur as a result of the very high decarburization rate of the liquid iron. A disadvantage of this is a relatively inhomogeneous melt.

Regarding the relevant prior art, reference is also made to GB-A-939,521, from which it is known to surround the reactor vessel in the melt region by a vertically adjustable magnetic coil, through which direct current flows and which generates magnetic induction in the range of 3 mT–30 mT. The molten metal is thereby set in circular motion. The arc consequently becomes more stable and more easily controllable.

SUMMARY OF THE INVENTION

Accordingly, one object of the invention, is to develop a meltdown apparatus of the initially mentioned type further in such a way that it allows improved operation.

One advantage of the invention is that a homogeneous melt is obtained and the specified supply of reactant guarantees a highly effective reaction.

According to advantageous embodiments of the invention, slag and melt can be removed from the meltdown apparatus at relatively small tilting angles of the latter. As a result of the tilting, the reaction region and arc region can easily be modified, so that the reaction zone is extended. Supplied material which lies unfavorably can be processed more effectively as a result of the tilting of the meltdown apparatus.

Undesirable splashing of slag into the cover region of the meltdown apparatus can be reduced by means of a magnetic coil.

The invention is particularly suitable for producing steel from various proportions of liquid iron, solid iron, spongy iron and scrap iron. Two meltdown apparatuses can be operated simultaneously, one in the converter mode and the other in the arc mode. Thereafter, the electrode and the reactant supply conduit are exchanged and the methods are alternated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the invention is explained below by means of exemplary embodiments and wherein.

DESCRIPTION OF THE PREFERRED EMBODIMENTS

Figure 1:
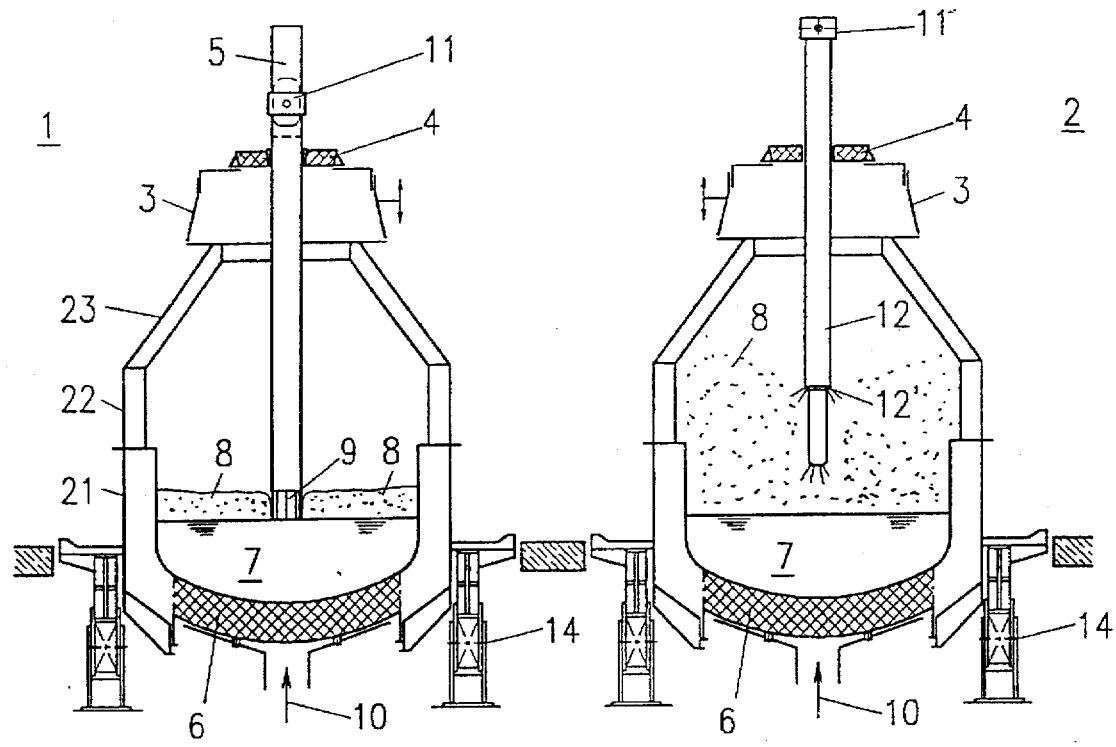
FIG. 1 shows a sectional representation of two identically designed reactor vessels for metal refining, on the left with a graphite electrode guided through a cover and on the right with an oxygen supply conduit instead of the graphite electrode.

Referring now to the drawings, wherein like reference numerals designate identical or corresponding parts throughout the several views, FIG. 1 shows two adjacent, identically designed meltdown apparatuses or arc furnaces or reactor-vessels (1, 2) in cross section, with a reactor lower part (21), a somewhat thinner-walled cylindrical reactor middle part (22) and a frustoconical part (23) which adjoins the latter and tapers upward and which can be closed by a removable outlet hood or hood (3) and a water-cooled cover (4). The reactor lower part (21) has, in a central part of the bottom, a bottom electrode (6) cooled by a cooling fluid, preferably air (10). Located in the lower part of the reactor lower part (21) is a molten bath or a melt (7) and, above it, slag (8). The reactor vessels (1, 2) are each supported on a roller bearing (14), see also FIG. 3, which allows rotational movements of the respective reactor vessel (1, 2). Guided through the electrically insulating cover (4) is a first electrode or graphite electrode (5), between which and the melt (7) an arc (9) burns during operation. Via a height adjustment device (11) indicated merely diagrammatically, the graphite electrode (5) can be adjusted in height and can be removed from the reactor vessel (1).

In the reactor vessel (2), instead of the graphite electrode (5), an oxygen lance or a gas supply conduit (12) for introducing oxygen or gas at a pressure of, for example, 1.5 MPa is provided. As a result of this inflow of gas, liquid iron and slag (8) are swirled. The gas supply conduit (12) can be adjusted in height by means of the height adjustment device (11) and can be removed from the reactor vessel (2). The gas supply conduit (12) has additionally, not only at its end, upper nozzles (12') which ensure postcombustion of the gases in the upper furnace space or in the reactor middle part (22) and in the frustoconical part (23). Below the upper nozzles (12'), the bar-shaped gas supply conduit (12) has a smaller diameter in relation to its upper part.

Instead of the gas supply conduit (12), the graphite electrode (5) can be introduced into the reactor vessel (2). Correspondingly, the gas supply conduit (12) can be introduced into the reactor vessel (1) instead of the graphite electrode (5). Thus, each of the two reactor vessels (1, 2) can be operated both as a converter with a gas supply conduit (12) and as an arc furnace with a graphite electrode (5). Consequently, steel can be produced from spongy iron and/or pig iron and/or scrap and/or solid iron in only one reactor vessel (1, 2).

For the pure arc mode, the reactor middle part (22) and the frustoconical part (23) would not be necessary. For the pure converter mode, the bottom electrode (6) would not be necessary.

Figure 2:
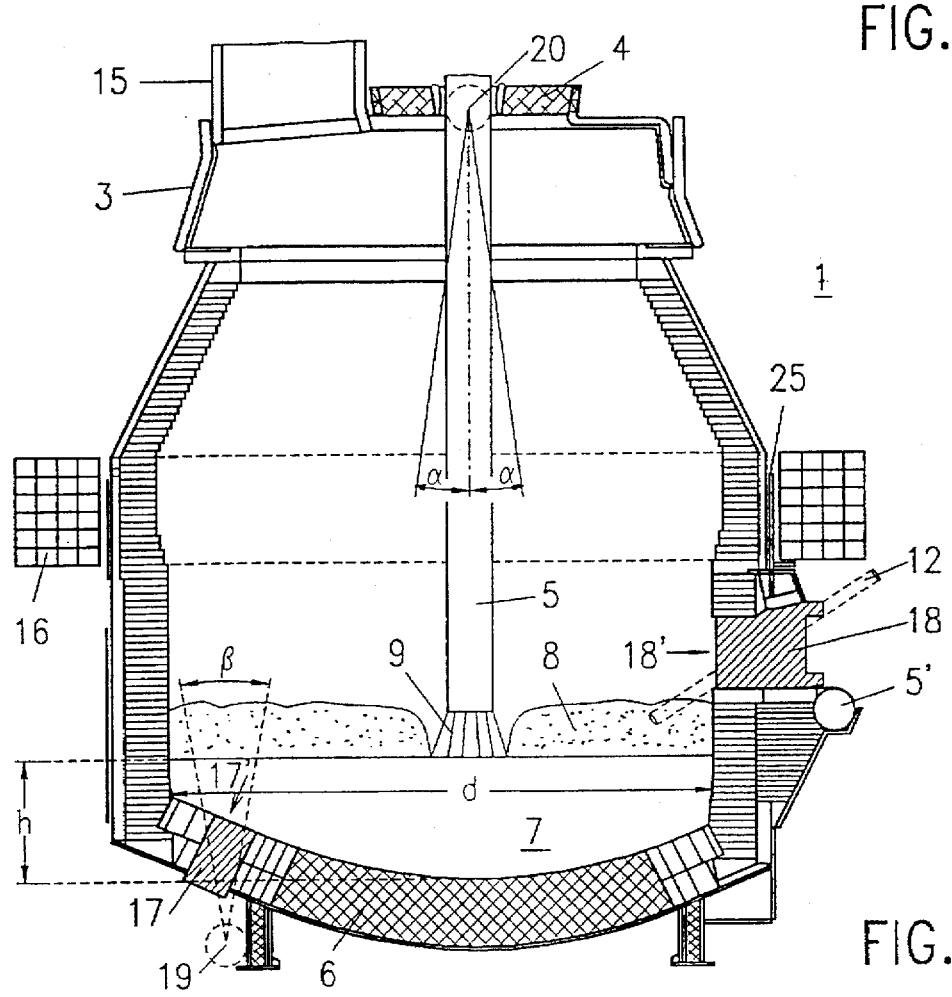
FIG. 2 shows a detailed representation of the left-hand reactor vessel of FIG. 1 in a vertical sectional view in respect of that of FIG. 1, with two closing elements of casting channels and with a magnetic coil for the electromagnetic damping of movements of the content of the reactor vessel.

FIG. 2 shows the reactor vessel (1) according to FIG. 1 in a cross section orthogonal with respect to FIG. 1. While the arc is operating, for example spongy iron can be supplied into the reactor vessel (1) through an orifice or an outlet duct (15); process exhaust gases can simultaneously escape from the reactor vessel (1).

In order to guarantee an efficient oxygen-blowing process in the converter mode of the reactor vessel (1), the ratio of a molten bath height (h) to a molten bath diameter (d) is to be in the range of 0.05–5, preferably in the range of 0.25–0.35. The reaction volume is to be within a range of 0.5 m³/t–1.5 m³/t of molten material, preferably within 0.77 m³/t–1.29 m³/t.

In the bottom region of the reactor lower part (21), a first discharge duct or a melt channel (17') for the melt (7) is located laterally adjacent to the bottom electrode (6) and so as to be electrically insulated from the latter. This melt channel (17') can be closed by a hydraulically actuable tapping component (not shown) and a first closing element or a melt channel closure (17). The reactor vessel (1) can be rotated by means of a rotary device (not shown) about a first center of rotation (19) through a predeterminable angle of rotation ($\beta$) of $\leq 60°$, preferably of $\leq 35°$, particularly through 30°. This first center of rotation (19) is located just below the bottom side of the reactor lower part (21) between the melt channel (17') and bottom electrode (6); it allows the liquid metal to be emptied out of the reactor vessel (1) completely.

A second discharge duct or a slag channel (18') for the removal of the slag (8) is located in the vertical cylindrical region of the reactor lower part (21), slightly above the region of the slag (8), in the arc mode. This slag channel (18') can be closed by a hydraulically actuable second closing element (not shown) and a slag plug (18) which terminates flush on the inner wall of the reactor vessel (1) and which widens outward. For the removal of the slag (8), the reactor vessel (1) can be rotated about a second center of rotation (20) in the central region of the graphite electrode (5) in the region of the cover (4) through a predeterminable angle of rotation ($\alpha$) in the range of ±45°, preferably in the range of ±10°, particularly of ±8°. The slag plug (18) which widens outward guarantees easy opening and prevents the formation of a slug on its inner surface during the oxygen-blowing process; it can be exchanged easily.

With the slag channel (18') open, the gas supply conduit (12) can be introduced into the slag (8), in order to accelerate a chemical reaction in the melt and slag (8), as indicated by broken lines.

A spent electrode bar (5') laterally below the slag channel (18') serves for making the discharge of the slag (8) easier.

A magnetic coil (16) is arranged around the upper region of the reactor middle part (22), in order to reduce pronounced uncontrolled movements of the melt (7) and foaming of the slag (8) during the converter process by means of electromagnetic damping. The magnetic coil (16) is fed with direct current via a rectifier (not shown).

In a reactor vessel (1, 2) with a diameter of 6.1 m for 160 t of molten material, the magnetic coil (16) should have a mean diameter of 9 m. During operation, the magnetic induction B of the annular magnetic coil (16) should be in the range of 50 mT–120 mT; it is calculated in Tesla according to:

$$B = \mu_0 \cdot i \cdot n / D,$$

$\mu_0$ being the magnetic field constant ($4 \cdot \pi \cdot 10^{31\ 7}$), i the coil current in amperes, n the number of turns of the magnetic coil (16) and D its mean diameter in meters. Thus, for a required magnetic induction B of 100 mT and a coil current i of 25 kA, 30 turns, for example consisting of copper, with a total length of 850 m are required. With a current density in the conductor of 6 A/mm², a cross-sectional area of 41.67 cm² is required, thus resulting in a copper mass of 31.5 t. The necessary coil voltage is 6·850·0.017 V=87 V and the necessary power is 87·25 kW=2.175 MW. With an operating time of 30 minutes, therefore, an electrical power of 7 kWh/t of steel is required. In the arc mode, this magnetic coil (16) serves for controlling the bath movement by means of relatively low magnetic induction.

Instead of a single magnetic coil (16) in the upper reactor middle part (22), it is also possible, for example, to use two coils of half power, one of which is arranged in the upper reactor part (22) and the other of which is arranged in the reactor lower part (21) or underneath the bottom of the reactor lower part (21) (not shown). So as not to weaken the effect of the magnetic field of the magnetic coil (16), at least some wall parts of the reactor vessels (1, 2) should consist of nonmagnetic material/steel. The wear of refractory bricks for the reactor vessels (1, 2) can be reduced as a result of the use of this magnetic coil (16).

Figure 3:
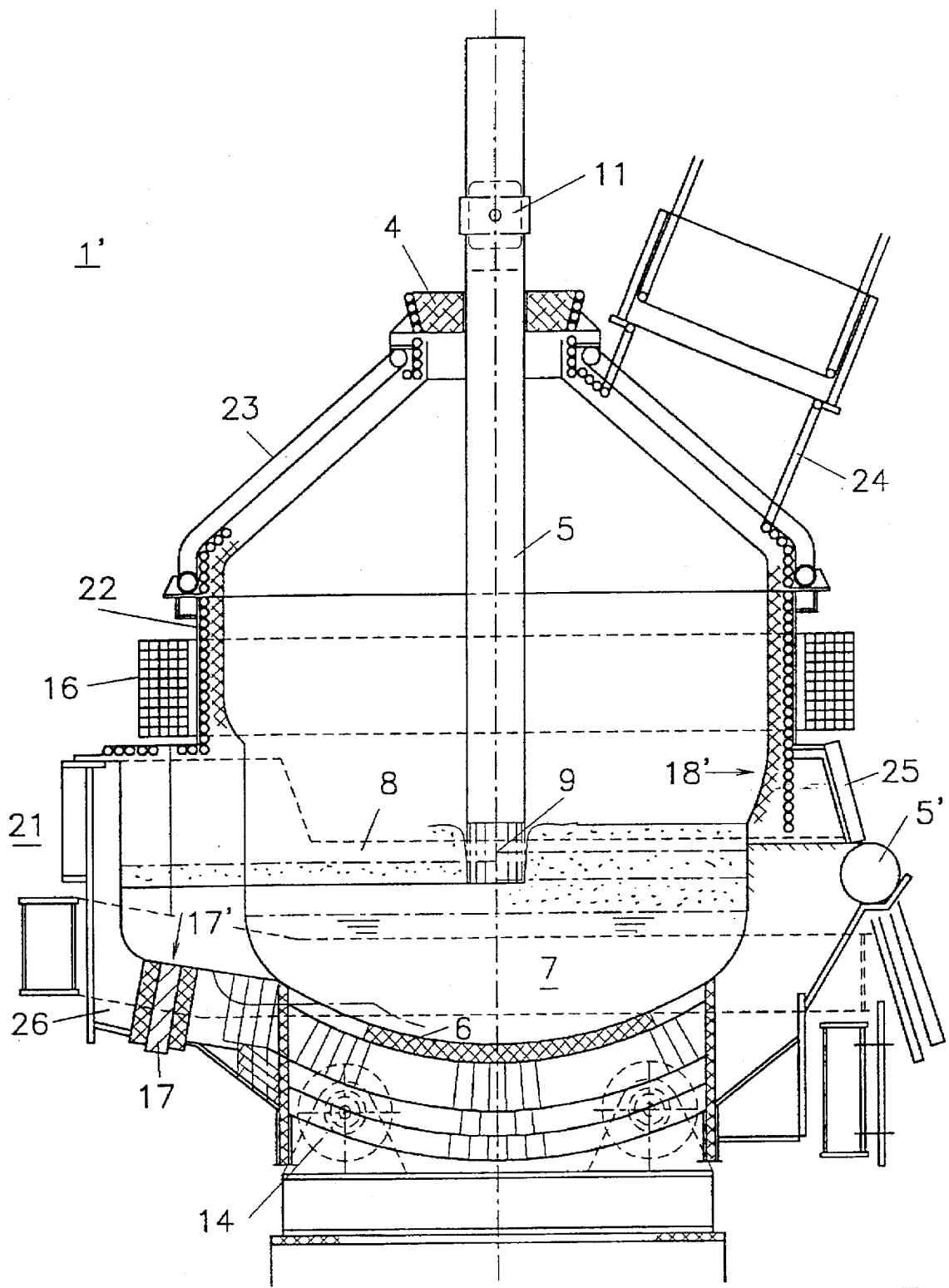
FIG. 3 shows a sectional representation through a reactor vessel according to FIG. 2, with a duct, arranged outside the cover region, for the supply of material to be melted and for the discharge of gases.

FIG. 3 shows, as a modification of FIG. 2, a reactor vessel (1'), in which, instead of the outlet duct (15), an orifice or a lateral duct (24) in the frustoconical part (23) is provided for charging with material to be melted and for the discharge of gases. The slag channel (18') is not closed by means of a slag plug (18), as in the reactor vessel (1) according to FIG. 2, but by means of a slag door (25). The reactor lower part (21) has an asymmetric widening or, on the left, a bay (26), in which the melt channel (17') capable of being closed by means of a melt channel closure (17) is arranged, likewise in the bottom region of the reactor lower part (21).

The reactor vessels (1, 2) can, or example, be operated with three-phase alternating current arcs (not shown), but preferably with direct current arcs which guarantee a more uniform heat distribution. It is important that the reactor vessels (1, 2) have the shape and dimensions of converters and can be operated both as converters and as arc furnaces. The melt channel (17') and slag channel (18') with associated closing devices (17, 18, 25) can be repaired or serviced from inside and from outside.

It goes without saying that both the reactor lower part (21) and the reactor middle part (22) as well as the frustoconical part (23) can be fluid-cooled.

Instead of being used for the refining of iron, the meltdown apparatus (1, 2) can also be used for refining other metals, such as, for example, copper and lead, for producing oxides, for example titanium oxides, and for slag treatment. In this case, for example, carbon can be introduced through the reactant supply conduit (12) instead of oxygen.

Obviously, numerous modifications and variations of the present invention are possible in light of the above teachings. It is therefore to be understood that, within the scope of the appended claims, the invention may-be practiced otherwise than as specifically described herein.

What is claimed as new and desired to be secured by Letters Patent of the United States is:

1. A meltdown apparatus, comprising:
    at least one first extendable and retractable supply conduit which, in an arc mode, is at least one first electrode;
    at least one second electrode;

at least one closable melt channel for emptying a molten material;

at least one closable slag channel removal of slag;

a cover through which the at least one first movable supply conduit is guided; and at least one further orifice, wherein the at least one first electrode is exchangeable for at least one reactant supply conduit such that, during operation, the at least one first electrode and the at least one reactant supply conduit are guidable successively in time through the same orifice in the cover, the meltdown apparatus is mounted rotatably about a first center of rotation through a first angle of rotation below a bottom side of a reactor lower part between the melt channel and the second electrode and about a second center of rotation through a second angle of rotation in a central region of the first movable supply conduit in a region of the cover.

2. The meltdown apparatus as claimed in claim 1, wherein the at least one closable slag channel includes a slag plug for closing the at least one closable slag channel, the slag plug widening outward and terminating flush on an inner wall of the meltdown apparatus.

3. The meltdown apparatus as claimed in claim 1, wherein at least one magnetic coil fed with direct current is arranged around a reactor middle part of the meltdown apparatus, the magnetic coil magnetically damping movements of melt inside the meltdown apparatus, the at least one magnetic coil generating magnetic induction during operation in a range of 50 mT–120 mT.

4. The meltdown apparatus as claimed in claim 1, wherein the at least one further orifice and the cover are arranged within a hood.

* * * * *